US010922469B1

(12) United States Patent
Pei et al.

(10) Patent No.: US 10,922,469 B1
(45) Date of Patent: Feb. 16, 2021

(54) METHODS AND SYSTEMS OF ENABLING CONCURRENT EDITING OF HIERARCHICAL ELECTRONIC CIRCUIT LAYOUTS

(71) Applicant: CADENCE DESIGN SYSTEMS, INC., San Jose, CA (US)

(72) Inventors: Yuan-Kai Pei, Taipei (TW); Gautam Kumar, Livingston (GB); Gerard Tarroux, Villenaeuva-Loubet (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/917,080

(22) Filed: Jun. 30, 2020

(51) Int. Cl.
*G06F 30/392* (2020.01)
*G06F 30/31* (2020.01)
*G06F 111/20* (2020.01)
*G06F 111/02* (2020.01)

(52) U.S. Cl.
CPC ............ *G06F 30/392* (2020.01); *G06F 30/31* (2020.01); *G06F 2111/02* (2020.01); *G06F 2111/20* (2020.01)

(58) Field of Classification Search
CPC .... G06F 30/392; G06F 30/31; G06F 2111/02; G06F 2111/20
USPC ....................................................... 716/102
See application file for complete search history.

(56) References Cited

U.S. PATENT DOCUMENTS

| | | | |
|---|---|---|---|
| 6,708,313 B2* | 3/2004 | Pfeil ..................... | G06F 30/39 716/102 |
| 6,711,718 B2* | 3/2004 | Pfeil ..................... | G06F 30/00 716/137 |
| 6,742,165 B2 | 5/2004 | Lev et al. | |
| 6,862,220 B2 | 3/2005 | Kawahara et al. | |
| 7,000,220 B1 | 2/2006 | Booth | |
| 7,143,341 B1 | 11/2006 | Kohli | |
| 7,546,571 B2 | 6/2009 | Mankin et al. | |
| 7,590,963 B2 | 9/2009 | Petunin | |
| 7,603,636 B2 | 10/2009 | Yamada | |
| 7,823,116 B2* | 10/2010 | Chan ..................... | G06F 30/39 716/104 |
| 7,941,399 B2* | 5/2011 | Bailor .................. | G06F 3/1454 707/608 |
| 8,010,917 B2* | 8/2011 | Cross .................... | G06F 30/30 716/100 |
| 8,028,229 B2* | 9/2011 | Bailor .................. | G06F 40/197 715/255 |
| 8,209,605 B2 | 6/2012 | Poston et al. | |
| 8,214,395 B2* | 7/2012 | Stevens ................. | G06Q 10/10 707/783 |
| 8,326,926 B2 | 12/2012 | Sangem et al. | |
| 8,352,870 B2* | 1/2013 | Bailor .................. | G06F 16/954 715/751 |

(Continued)

*Primary Examiner* — Suresh Memula
(74) *Attorney, Agent, or Firm* — Foley & Lardner LLP

(57) ABSTRACT

Embodiments described herein provide a new layout editor tool allowing designers to concurrently edit various aspects of an electronic circuit layout, even at disparate hierarchical levels of the design. The new layout editor tool enables multiple electronic circuit designers to concurrently edit a layout a different hierarchical levels, by logically establishing editable child sub cell-level partitions within a parent layout-level partition, each of which representing various components of the same electronic circuit layout.

20 Claims, 10 Drawing Sheets

(56) References Cited

U.S. PATENT DOCUMENTS

| | | | |
|---|---|---|---|
| 8,417,666 B2* | 4/2013 | Bailor | G06F 21/6227 |
| | | | 707/608 |
| 8,516,399 B2 | 8/2013 | Paris et al. | |
| 8,543,337 B2 | 9/2013 | Paxson et al. | |
| 8,612,923 B2 | 12/2013 | Arora et al. | |
| 8,694,952 B2* | 4/2014 | Holdsworth | G06F 30/15 |
| | | | 716/139 |
| 8,918,363 B2 | 12/2014 | Naidu et al. | |
| 8,966,425 B1 | 2/2015 | Eisenstadt et al. | |
| 9,171,119 B2 | 10/2015 | Aenuganti et al. | |
| 9,182,948 B1* | 11/2015 | O'Riordan | G05B 19/0426 |
| 9,304,981 B1* | 4/2016 | Patidar | G06F 40/169 |
| 9,619,608 B1 | 4/2017 | Bernard et al. | |
| 9,684,750 B1 | 6/2017 | Bernard et al. | |
| 9,721,052 B1 | 8/2017 | Bernard et al. | |
| 10,127,343 B2* | 11/2018 | Suiter | G06F 30/398 |
| 10,151,599 B1* | 12/2018 | Meador | G06F 30/13 |
| 10,192,020 B1* | 1/2019 | Ginetti | G06F 30/39 |
| 10,404,700 B1 | 9/2019 | Bernard et al. | |
| 2002/0156757 A1 | 10/2002 | Brown | |
| 2003/0076722 A1* | 4/2003 | Solomon | G06F 30/39 |
| | | | 365/200 |
| 2004/0210854 A1* | 10/2004 | Pfeil | G06F 30/39 |
| | | | 716/102 |
| 2006/0200266 A1* | 9/2006 | Fotakis | G06F 30/39 |
| | | | 700/121 |
| 2012/0120086 A1 | 5/2012 | Dang et al. | |
| 2013/0262974 A1 | 10/2013 | Anstis et al. | |
| 2016/0034623 A1 | 2/2016 | Zhang et al. | |
| 2017/0177775 A1* | 6/2017 | Davis | H01L 23/544 |

* cited by examiner

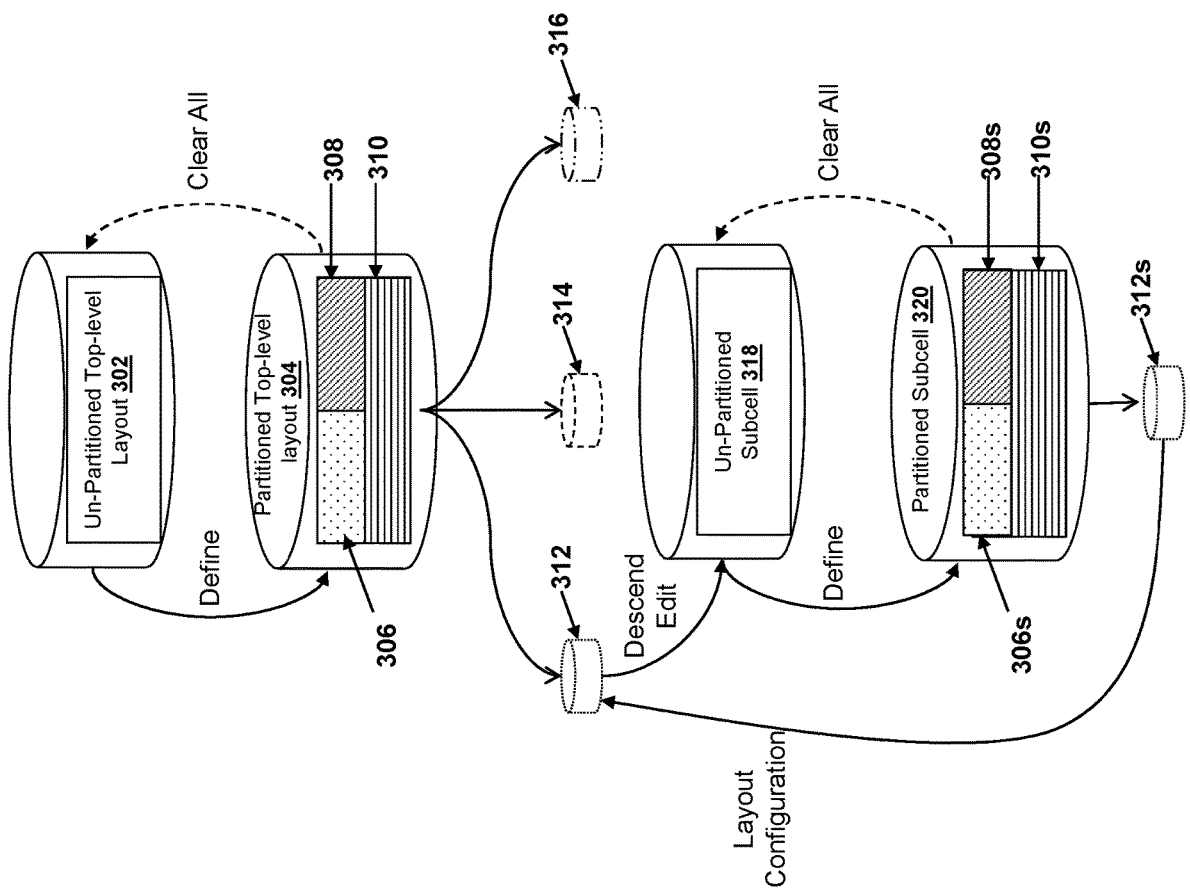

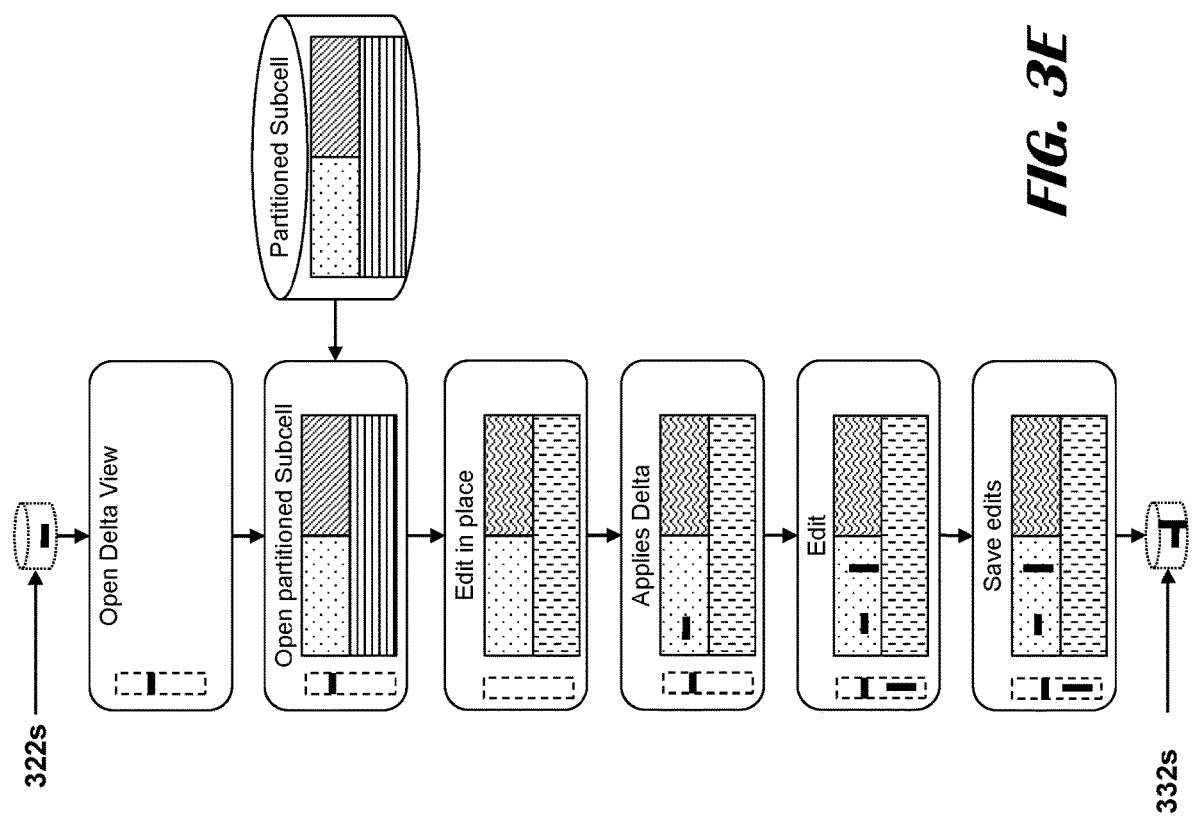

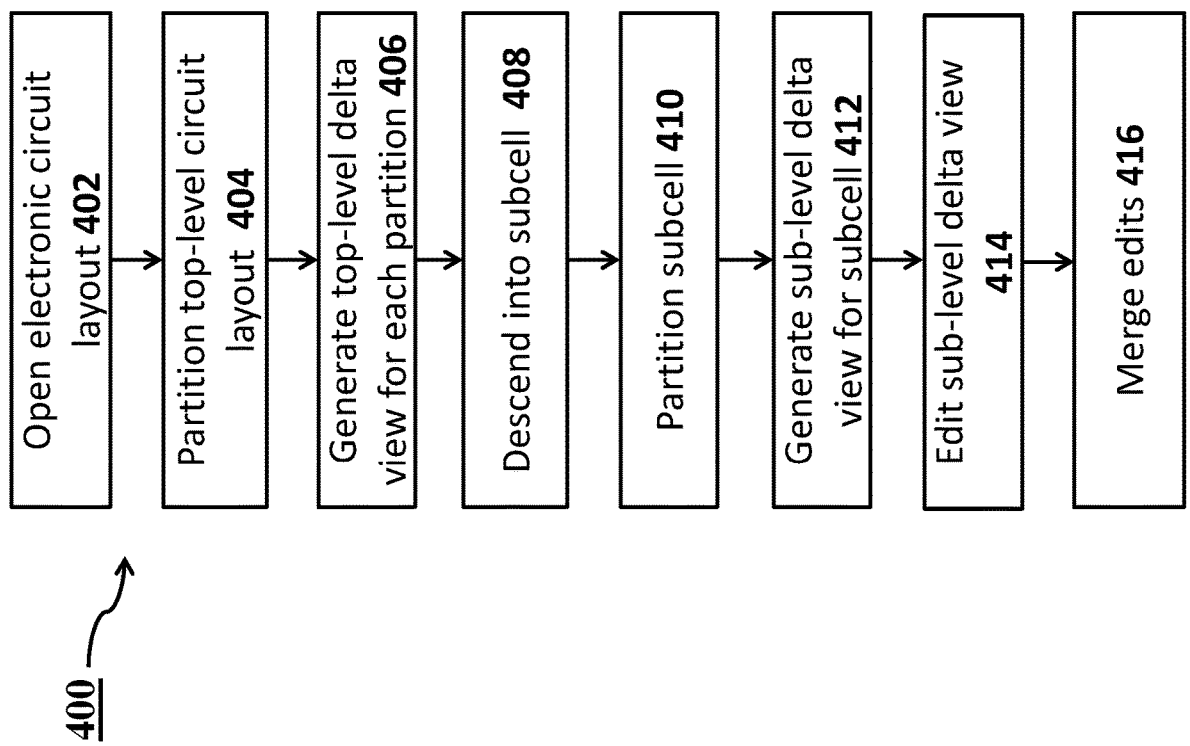

METHODS AND SYSTEMS OF ENABLING CONCURRENT EDITING OF HIERARCHICAL ELECTRONIC CIRCUIT LAYOUTS

CROSS-REFERENCE TO RELATED APPLICATIONS

This application is related to U.S. Pat. No. 9,842,183, entitled "Methods and systems for enabling concurrent editing of electronic circuit layouts," filed Sep. 29, 2015, issued Dec. 12, 2017, which is hereby incorporated herein in its entirety.

TECHNICAL FIELD

This application relates generally to the field of electronic circuits, and, more specifically, methods and systems for concurrent modification of the electronic circuit layouts.

BACKGROUND

A semiconductor circuit (e.g., integrated circuit, printed circuit board) has a large number of components such as transistors, logic gates, and diodes that are fabricated by forming layers of different materials and of different geometric shapes on various regions of a silicon wafer. To fabricate either a printed circuit board or an integrated circuit, a circuit designer can use an Electronic Design Automation (EDA) software program to create a schematic design, such as a schematic circuit layout. One advantage to an EDA tool is that it allows the designer to position and connect various shapes representing transistors or semiconductors on a circuit, even when there is a large number of components in the circuit. The circuit layout typically contains data layers corresponding to the fabrication layers to be implemented in the printed circuit board or the integrated circuit. Such semiconductor circuit layout designs typically adhere to a set of predefined criteria referred to as design rules, which are unique to the product, product type, or manufacturing process. Design-rule verification ensures that the circuit layout has been properly executed such that the final semiconductor circuit will adhere to certain geometric design rules. Various techniques have been developed to ensure conformance to the circuit layout design rules. The circuit layout can also be created and edited manually by the semiconductor designer. The semiconductor circuit designer can create and edit the circuit layout by means of a semiconductor circuit layout editor.

The semiconductor circuit layout is a representation of the semiconductor circuit in various semiconductor circuit layout data formats. These semiconductor circuit layout data formats involve both a binary format for the representation of planar geometric shapes and text labels. Further, the semiconductor circuit layout editor controls final physical implementation of a semiconductor circuit design through modifications made by the semiconductor circuit designer.

A semiconductor circuit layout database stores a variety of circuit components, templates, and layouts that make up the basic elements of the semiconductor circuit design. When the semiconductor circuit designer wants to edit or otherwise modify the circuit layout by means of the semiconductor circuit layout editor, the designer first opens the semiconductor circuit layout database to access the previously created circuit layout to be edited stored in the semiconductor circuit layout database. The semiconductor designer will typically use a software application that enables the semiconductor circuit designer to open the desired semiconductor circuit layout, and once opened, the semiconductor circuit designer can view a complete layout of the selected semiconductor circuit layout. The semiconductor circuit designer then implements changes using the semiconductor circuit layout editor, such as adding, deleting, revising, or otherwise altering circuit components to the circuit layout. After making the edits, the semiconductor circuit designer then saves the edited semiconductor circuit layout back in the semiconductor circuit layout database.

The conventional semiconductor circuit layout database does not allow several semiconductor circuit designers to update the semiconductor circuit layout concurrently in order to prevent errors occurring from two designers editing a same portion of a circuit layout. Preventing multiple semiconductor circuit designers working on the same semiconductor circuit layout at the same time occurs via a database management system. The database management system is software programmed to manage access and editing rights of multiple semiconductor circuit designers, such that editing of the semiconductor circuit layout, and consequently, on the semiconductor circuit layout database is restricted unless the semiconductor circuit designer has access rights and editing rights to perform a check-out of the semiconductor circuit layout. While the semiconductor circuit layout is checked-out, other semiconductor circuit designers are restricted from accessing the circuit layout and the database is locked for editing. Other semiconductor circuit designers may able to view the circuit layout, but cannot perform a check-out or otherwise edit the circuit layout. Thus, during check out mode, editing and updating access is provided to only the semiconductor circuit designer currently editing the checked-out semiconductor circuit layout. Once the semiconductor circuit designer is finished with editing, the semiconductor circuit designer performs a check-in and stores the modifications in the semiconductor circuit layout database. At this point, other semiconductor circuit designers will be able to access and view the updated semiconductor circuit layout.

The conventional method of editing is inefficient in today's advanced node processes where there is an extensive database of semiconductor circuit layouts, and it is desired that various semiconductor circuit designers work together on an extensive database having a collection of semiconductor circuit layouts. With the currently available system, the semiconductor circuit designers must work subsequently to each other, and there is no present capability to parallelize the tasks. This leads to wastage of both the resources and time. Therefore, there is a need in the art for methods and systems that address the above mentioned drawbacks of the conventional editing system employed for the semiconductor circuit layout designs.

Furthermore, an EDA tool may permit hierarchical relationships between devices or data levels. For example, a database may store a plurality of data cell views corresponding to a circuit component block that contain information relating to general attributes of the circuit component such as type, size, and position at a first data level. The database may further store on a second data level one or more subcell views in association with and/or within a data cell view corresponding to information such as maxima or minima restrictions, fabrication material or other physical attributes important to the physical implementation of the semiconductor circuit but unnecessary to be displayed or edited with each change implemented on a high level (e.g., moving a component from one position to another). It would be beneficial to provide the ability to edit the subcell views separately from the data cell views within the database such that the circuit components remain largely unaffected at the high level.

SUMMARY

Disclosed herein are methods and systems that address the above issues and may provide a number of additional or alternative benefits as well. The embodiments described herein provide a new layout editor tool to concurrently edit various hierarchical levels of an electronic circuit layout. The new layout editor tool enables multiple electronic circuit designers to concurrently edit a layout at different hierarchical levels, by logically establishing editable child sub-level partitions within a parent top-level partition, each of which representing various components of the same electronic circuit layout.

Embodiments herein provide for a processor-implemented method for at least two computers to concurrently create an electronic circuit layout. The method comprises generating, by a processor, a plurality of top-level partitions from an electronic circuit layout according to a predefined attribute, each of the plurality of top-level partitions corresponding to a portion of the electronic circuit layout at a top level stored as a first database record including the predefined attribute. The method further comprises generating, by the processor, a plurality of top-level delta views corresponding respectively to each top-level partition, wherein each respective top-level delta view is a cell view configured to store edits to the respective top-level partition as a second database record. In response to receiving, from a client computer having access rights to the top-level partition, a command to modify the cell view from the top-level partition, the method comprises modifying, by the processor, the second database record corresponding to the top-level delta view, thereby resulting in a modified second database record containing a modified top-level delta view. In response to receiving a command to modify a subcell view from the top-level partition, the method further comprises generating, by the processor, a plurality of sub-level partitions from a plurality of subcell views based upon the predefined attribute, each respective sub-level partition comprising the predefined attribute inherited from a top-level partition that corresponds to the portion of the electronic circuit layout at a sub level stored as a third database record including the predefined attribute. The method further comprises generating, by the processor, a plurality of sub-level delta views corresponding respectively to each sub-level partition, wherein each respective sub-level delta view is a subcell view configured to store edits to the respective sub-level partition as a fourth database record. The method further comprises, modifying, by the processor, the fourth database record corresponding to the sub-level delta view according to the command, thereby resulting in a modified fourth database record containing a modified sub-level delta view. The method further comprises displaying, by the processor, a representation of the modified sub-level delta view to the client computer having the access rights, wherein the first database record and the third database record remain unmodified by the command.

Embodiments herein further provide for a system for creating an electronic circuit layout. The system comprises a non-transitory machine-readable layout database storing an electronic circuit layout of an electronic circuit and a processor. The processor is configured to generate a plurality of top-level partitions from a circuit layout according to a predefined attribute, each respective top-level partition corresponding to a portion of the electronic circuit layout at a top level stored as a first database record including the predefined attribute. The processor is further configured to generate a plurality of top-level delta views corresponding respectively to each top-level partition, wherein each respective top-level delta view is a cell view configured to store edits to the respective top-level partition as a second database record. The processor is further configured to receive a command to modify the cell view. In response to receiving the command, the processor is further configured to modify the second database record corresponding to the top-level delta view, thereby resulting in a modified second database record containing a modified top-level delta view. The processor is further configured to receive, from a client computer, a command to modify a subcell view within a sub-level partition. In response to the processor receiving the command, the processor is configured to generate a plurality of sub-level partitions from a plurality of subcell views based upon the predefined attribute, each respective sub-level partition comprising the predefined attribute inherited from the top-level partition that corresponds to the portion of the electronic circuit layout at a sub level stored as a third database record including the predefined attribute. In response to the processor receiving the command, the processor is further configured to generate a plurality of sub-level delta views corresponding respectively to each sub-level partition, wherein each respective sub-level delta view is a subcell view configured to store edits to the respective subcell view as a fourth database record. In response to the processor receiving the command, the processor is further configured to modify the fourth database record corresponding to the sub-level delta view according to the command, thereby resulting in a modified fourth database record containing a modified sub-level delta view, wherein the first database record and the third database record remain unmodified by the commands.

Embodiments herein further provide for a processor-implemented method for creating an electronic circuit layout. The method comprises generating, by a processor, a plurality of top-level partitions from a circuit layout according to a predefined attribute, each respective top-level partition corresponding to a portion of the electronic circuit layout at a top level stored as a first database record including the predefined attribute. The method further comprises generating, by the processor, a plurality of sub-level partitions from a selected cell view in a top-level delta view, each respective sub-level partition corresponding to the portion of the electronic circuit layout at a sub level stored as a third database record. The method further comprises generating, by the processor, a plurality of sub-level partitions from a selected cell view in a top-level delta view, each respective sub-level partition corresponding to the portion of the electronic circuit layout at a sub level stored as a third database record. The method further comprises generating, by the processor, generating, by the processor, a plurality of sub-level delta views corresponding respectively to each sub-level partition, wherein each respective sub-level delta view is a cell view configured to store edits to the respective sub-level partition as a fourth database record. In response to receiving, from a client computer, a command to modify the cell view from a top-level partition, the method further comprises modifying, by the processor, the second database record corresponding to the top-level delta view according to the command, thereby resulting in a modified second database record corresponding to a modified top-level delta view. In response to receiving, from a client computer, a command to modify the cell view within a top-level partition, the method further comprises modifying, by the processor, based on the modified second database record, the fourth database record corresponding to the sub-level delta view inherited from the modified top-level delta view, thereby resulting in a modified fourth database record containing a modified sub-level delta view inherited from the modified top-level partition, wherein the first database record and the third database record remain unchanged by the command.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 3B illustrates a partitioned electronic circuit layout sub level, according to an embodiment.

FIG. 3E illustrates concurrent editing of a sub view of an electronic circuit layout, according to an embodiment.

FIG. 4 is a flow diagram illustrating a method of editing of an electronic circuit layout on a sub level, according to an embodiment.

DETAILED DESCRIPTION

Figure 1:
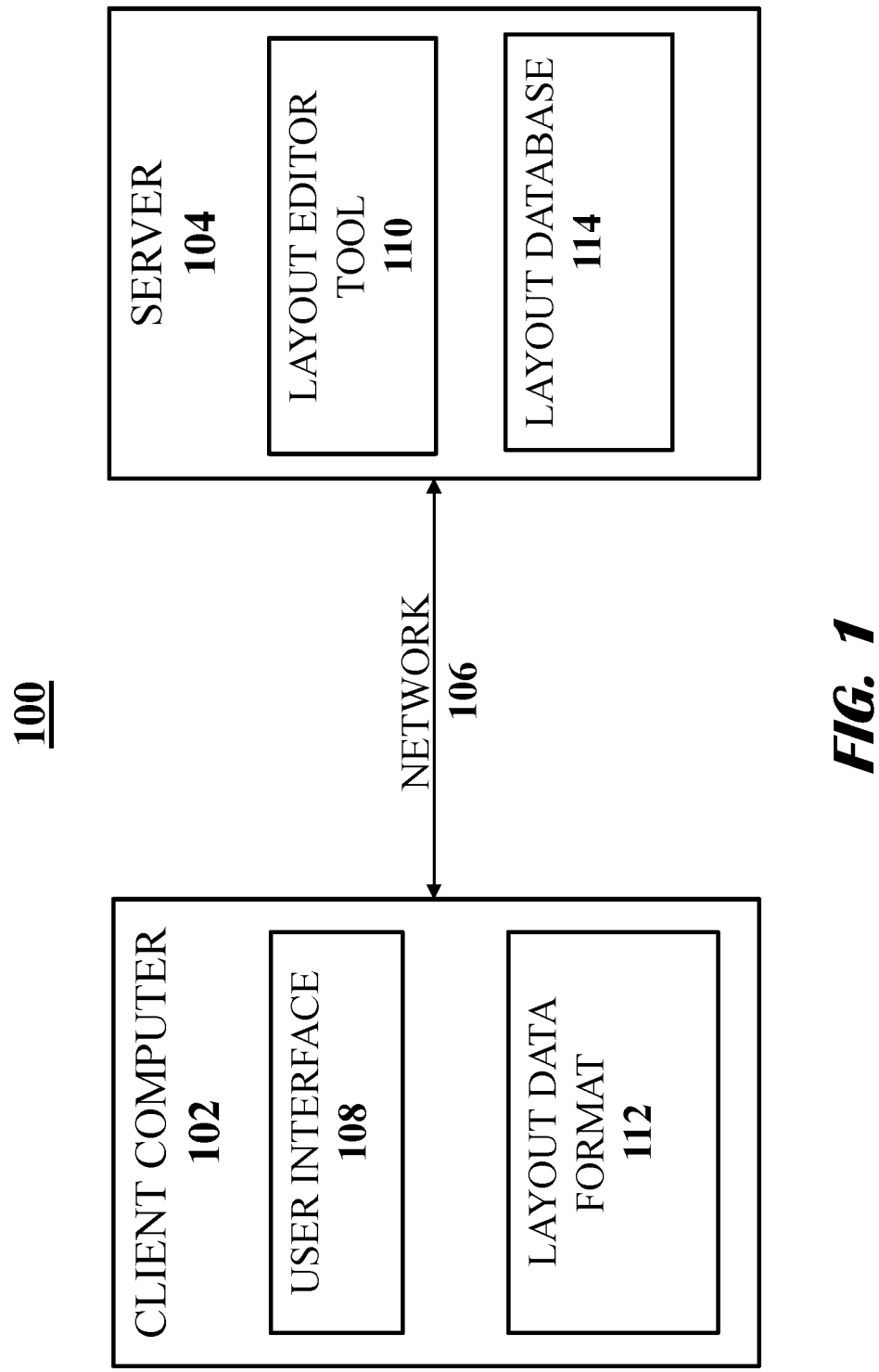
FIG. 1 illustrates various components for editing an electronic circuit layout on a sub level, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The embodiments herein provide an improved method and system hosting an Electronic Development Automation (EDA) software tool capable of facilitating concurrent editing of subcell views within an electronic circuit layout. The electronic circuit layout represents an electronic circuit in terms of planar geometric shapes on a graphical user interface (GUI) of the EDA tool. The planar geometric shapes correspond to the shapes actually imposed on masks used in semiconductor device fabrication. The electronic circuit layout has a hierarchical structure; for example, a top-level in the hierarchy corresponds to the planar geometric shape representation of the electronic circuit, and a sub-level in the hierarchy corresponds to objects or instances of circuit components represented by the planar geometric shapes, which may contain attributes capable of altering physical implementation of the electronic circuit. In addition to the planar shape representation, the top-level must contain at least one instance of a subcell view. The electronic circuit layout is designed and generated by the automatic EDA tool according to user inputs. The electronic circuit layout can also be created and edited manually by an electronic circuit designer. The electronic circuit designer can create and edit the electronic circuit layout by means of an electronic circuit layout editor of the EDA tool.

Various embodiments further provide an electronic circuit layout editor system that allows efficient electronic circuit layout data management. The electronic circuit layout includes a plurality of records (e.g., cell views) stored in a cell database; where a cell is a collection of related cell views. The plurality of records may contain references or pointers to other cell views stored separately in the cell database (e.g., subcell views). The electronic circuit layout editor system allows multiple electronic circuit designers to create top-level partitions of an electronic circuit layout. The top-level partitions are logically defined based on an attribute or property (e.g., one or more coordinate points, type of object, user-selected objects, mask layer) of the electronic circuit layout to identify a set of cell views accessible from a corresponding top-level partition. Each top-level partition corresponds to a cell view identified based on, for example, a point list attribute (e.g., a sequence of coordinate points) identifying, or pointing to, the portion of the circuit layout belonging to that cell view. When accessing a cell view of a top-level partition, a portion of the electronic circuit layout is loaded into memory as the cell view. Typically, when the electronic circuit designer wishes to edit the in-memory design of the cell view, any edits can be implemented within the cell view and saved in memory. However, in some cases, an electronic circuit designer may want to preserve the current in-memory electronic circuit layout, and the electronic circuit designer can create a top-level delta view associated with the top-level partition of the electronic circuit layout. A top-level delta view is a cell view that stores changes to the associated cell view within a top-level partition as a separate database record. The top-level delta view is empty upon creation and loads the portion of the in-memory electronic circuit layout stored as the cell view of the top-level partition. An electronic circuit designer can implement and store edits made to the top-level delta view using the EDA layout editor. These edits in the top-level delta view are stored as a separate database record from the cell view and can be merged with the cell view later in time.

A circuit designer can further access and edit data stored as a set of subcell view records in a database, able to be referenced by the top-level partition of the electronic circuit. For example in a defined top-level partition of an electronic circuit layout (e.g., cell view), a set of objects or instances (e.g., subcell views) representing circuit components can exist. When selected for editing by the circuit designer, an object or instance of the set of subcell views is opened as a subcell view, which contains a reference to the top-level delta view from which the object was accessed. The set of subcell views are partitioned into sub-level partitions according to the same point list as the top-level partitions (e.g., a child set of subcell views associated with a parent partition will inherit the same partition attributes), such that the subcell views accessed from the parent partition inherit the same attributes. Each sub-level partition can be edited in memory, or can be loaded into an empty sub-level delta view created for storing edits without editing the existing records in the database. Similar to the parent-child relationship between a top-level partition and an associated sub-level partition, the top-level delta view of the circuit layout partition includes a reference, or pointer, to the sub-level delta view of the sub-level partition, and vice versa. A sub-level delta view operates similarly to a top-level delta view such that a sub-level delta view is another instance that stores edits to the sub-level partition in a separate file in memory, such that the original subcell view and sub-level partition remain unchanged until edits can be merged into the sub-level partition from the cell view.

In an illustrative example, a top-level cell view is a circuit layout that is stored in a database record as a cell view of the layout, representing component objects (e.g., devices) of the layout. The database record of the top-level cell view may contain references to other cell views (sometimes referred to as "instances" of subcell views). A subcell view is stored in a database record separately from the cell view. A top-level partition is a point list that specifies or defines a portion (e.g., geometric area) of the top-level layout. The dimensions or portion of the partition is specified according to a partition property or attribute (sometimes referred to as a "partition definition"). The partition attribute for a top-level partition may be stored in (or otherwise associated with) the database record for the cell view, such that the database record of the top-level partition is augmented, updated, or otherwise associated with the partition attribute. When a designer accesses and edits components inside a top-level partition, the changes will be saved to a corresponding top-level delta view, which is stored as a distinct database record for the top-level delta view. However, the cell view (and the related database record for the cell view) remains unchanged.

The designer may decide to make changes at a hierarchically lower level and enter a "descend edit" command via a GUI by selecting an object or instance within the top-level delta view to instantiate a sub-level delta view associated with the chosen object subcell view. The system (e.g., server, client computer) may perform the descend edit routines within an instance (e.g., subcell view) within the relevant area of the top-level partition. In some prior approaches, the designer would edit the subcell view (and related database record) directly. As discussed herein, in order to "push down" or descend from the top-level partition into a sub-level partition, the subcell views inherit the top-level partition "attributes." The subcell view (and related database record) is augmented or otherwise updated according to the top-level partition attributes, resulting in a sub-level partition of the subcell view corresponding to the portion of the electronic circuit area designated in the top-level partition. When the designer makes edits within the sub-level partition to a subcell view, the changes are saved to a corresponding sub-level delta view, which is stored into a distinct database record. As before, the portion of the electronic circuit at the sub-level represented by the subcell view (and related database record for the subcell view) remains unchanged.

The electronic circuit layout editor system allows multiple electronic circuit designers to edit a subcell view within different sub-level partitions of the set of subcell views of the same electronic circuit layout at the same time. For example, a subcell view that straddles partitioned cell views (e.g., exists along a boundary of at least two partitions), can inherit multiple partition attributes such that subcell view itself is partitioned into sub-level partitions along the same boundary as the top-level partition. In this way, at least two electronic circuit designers can implement edits to the subcell view according to other changes, such as coordinate changes, made at the top-level or sub-level partition. Multiple electronic circuit designers concurrently editing the electronic circuit layout at various levels can locally save the edited version of the subcell view as a sub-level delta view file. The electronic circuit layout editor system allows multiple electronic circuit designers to generate edited versions of the electronic circuit layout separate from an original copy of the electronic circuit layout. The electronic circuit designers may make their edits to the electronic circuit layout available to each other, while continuing to track concurrent changes and inhibiting certain changes in some cases. The electronic circuit layout editor system comprises an electronic circuit layout manager software routine that tracks and controls changes and merges the edits of the multiple electronic circuit designers into the original copy of the electronic circuit layout.

FIG. 1 illustrates various components for editing an electronic circuit layout 100, according to an embodiment. The components include a client computer 102 and a server 104. The client computer 102 may communicate with the server 104 via a network 106. The network 106 refers to a medium that also connects various computing devices. Examples of the network 106 include, but are not limited to, LAN, WLAN, MAN, WAN, and the Internet, as well as cloud-based computing networks and platforms. The communication over the network 106 may be performed in accordance with various communication protocols such as Transmission Control Protocol and Internet Protocol (TCP/IP), User Datagram Protocol (UDP), and IEEE communication protocols.

The client computer 102 is a computing device operated by a user (e.g., an electronic circuit designer, design manager) via one or more user interfaces 108 (e.g., a GUI). The client computer 102 may be any computing device having a processor, a memory and software programmed to perform one or more operations like those described herein. Examples of the client computer 102 include, but are not limited to, a desktop computer, a laptop, a personal digital assistant (PDA), a tablet computer, or the like. The client computer 102 is capable of communicating with the server 104 through the network 106 using wired or wireless communication capabilities. The client computer 102 also includes a collection of software tools capable of implementing different features and functions accessible using the GUI 108, and various electronic circuit layout data formats 112 including but not limited to a Graphic Database System ("GDS" or "GDSII") database format, a Manufacturing Electron Beam Exposure System (MEBES) database format, and an Open Artwork System Interchange Standard (OASIS) database format.

The server 104 is a computing device capable of communication with the client computer 102. The server 104 is accessible to the client computer 102 via the network 106. The server 104 may be a computing device including having a processor, a memory and software programmed to perform one or more operations like those described herein. The server 104 may be a computing device connected to a remotely located server location via a cloud connection. In some embodiments, multiple client computers can access server 104 via the network 106 and request access to the electronic circuit layouts stored therein. The server 104 can host a layout database 114 containing electronic circuit design components relating to the electronic circuit layout. The server 104 can receive instructions from the client computer 102 via GUI 108 to facilitate editing of an electronic circuit layout design stored in a layout database 114. The server 104 includes a layout editor tool 110 that comprises a collection of software tools capable of implementing editing functions such as adding, deleting, revising, or otherwise affecting the electronic circuit layout from within the user interface 108. The layout editor tool 110 has access to the layout database 114 such that the layout editor tool 110 can create instances in the GUI 108 of circuit components stored within layout database 114. The electronic circuit designer of the client computer 102 uses the layout editor tool 110 to facilitate the editing of the electronic circuit design layout. The user may interact with the layout editor tool 110 through a number of input devices, such as by inputting a selection as with a mouse or inputting a request as with a keyboard. The user may observe the response to the access request on an output device or display. The layout editor tool 110 may also run in an application window controlled by the user.

The layout database 114 stores various electronic circuit layouts and pattern libraries (e.g., libraries containing templates of circuit components, various often-used combinations). The layout database 114 generally stores basic circuit components to be added to the electronic circuit layout design. The layout database 114 stores data records for instances and sub-instances for each circuit component. The data records themselves can have multiple fields of hierarchical data. For example, a data record (e.g., a data table or cell) can exist on multiple levels of data wherein data related to a particular table or cell view is stored in association with and/or within that data table or cell view as a subcell view. When a circuit designer makes changes within the GUI 108, the layout database 114 receives instructions from client computer 102 via server 104 to manipulate the data tables, data cells, or subcells of the data stored within the database. In one instance, a circuit designer may move a circuit component from one position to another position within the GUI 108; layout database 114 in response would alter the data cell or table to contain the updated position information of the circuit component. In another instance, the circuit designer may duplicate a component within the GUI 108; layout database 114 in response would create a duplicate data table or cell to provide for the new instance of the component. In another instance, the circuit designer may alter an attribute contained within the circuit component such as a gate width of an instance of a transistor within the GUI 108; layout database 114 in response would enter a subcell view of a data table or data cell to edit the value corresponding to the gate width.

Figure 2:
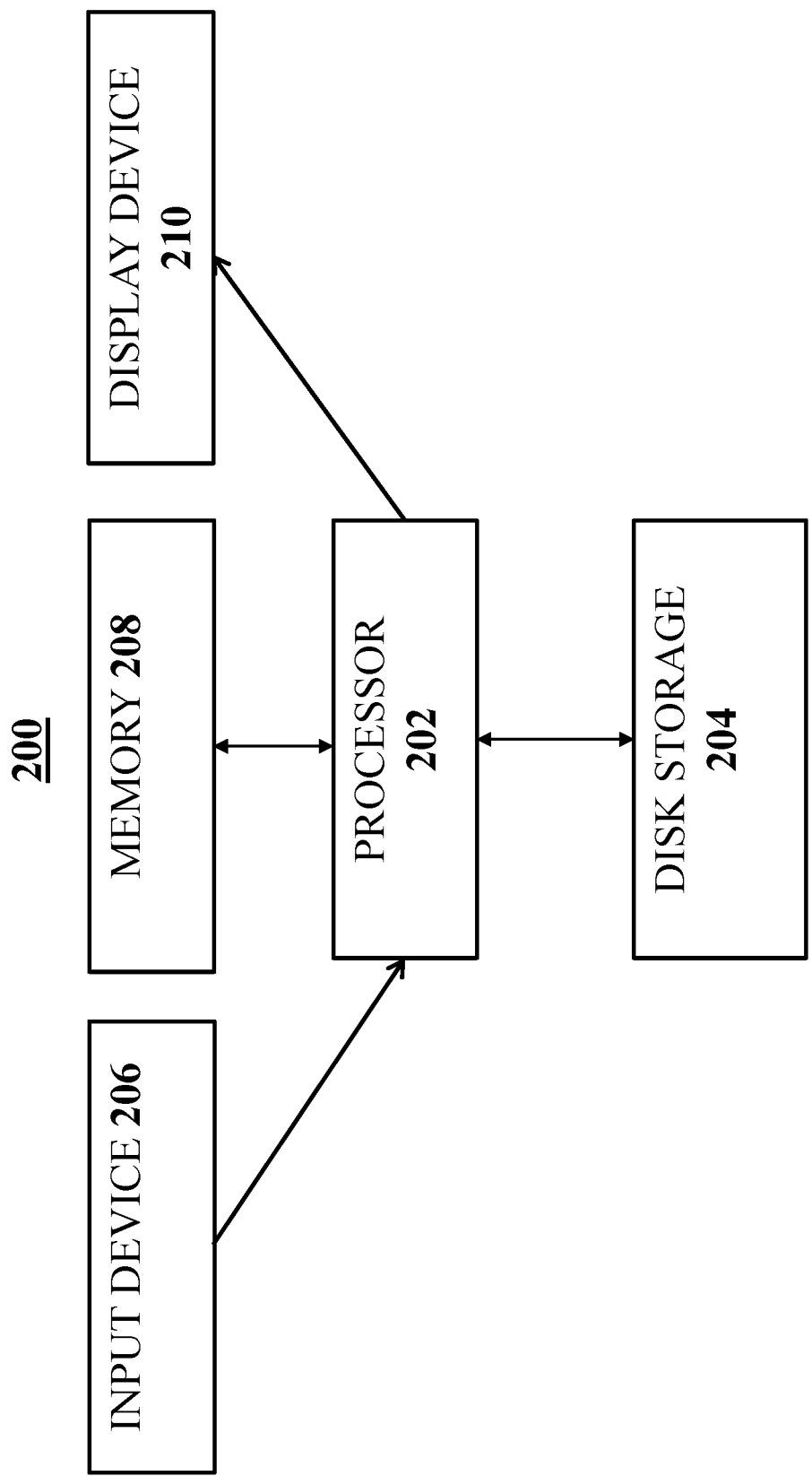
FIG. 2 is a block diagram depicting components of an electric circuit layout editing system, according to an embodiment.

FIG. 2 is a block diagram depicting components of an electric circuit layout editing system 200, according to an embodiment. The system 200 includes a processor 202, disk storage 204, an input device 206, a memory 208, and a display device 210. In one implementation, all the components of system 200 may be connected via interconnect bus. In another implementation, the processor 202 and the disk storage 206 may be connected via a local microprocessor bus, and the remaining units of the system 200 may be connected via one or more input/output buses.

The processor 202 utilizes processing system to control the operations of the system 200. The processor 202 may include a single processor or a plurality of processors for configuring the system 200 as a multi-processor system. The processor 202 includes suitable logic, circuitry, and interfaces that are operable to execute one or more instructions to perform predetermined operations/tasks. The processor 202 can be realized through a number of processor technologies known in the art. Examples of the processor 202 include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor.

The disk storage 204 is a non-volatile storage device for storing electronic circuit layouts and instructions, to be used by the processor 202. The disk storage 204 is implemented with a magnetic disk drive, an optical disk drive, a solid state device, or an attachment to network storage. The disk storage 204 may comprise one or more memory devices to facilitate storage and manipulation of program code, set of instructions, tasks, data, PDKs, and the like. Some of the commonly known disk storage 204 implementations include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Further, the disk storage 204 includes the one or more instructions that are executable by the processor(s) of the processor 202 to perform specific operations. It is apparent to a person having ordinary skill in the art that the one or more instructions stored in the disk storage 204 enable the processor 202 of the system 200 to perform the predetermined operations/tasks. The support circuits for the processor include conventional cache, power supplies, clock circuits, data registers, I/O interfaces, and the like. The I/O interface may be directly coupled to the disk storage 204 or coupled to the processor of the processor 202.

The input device 206 may be a keyboard, mouse, pointer, or other input generating device to facilitate input of control instructions by the integrated circuit designer to the processor 202. In one embodiment, the input device 206 provides a portion of the user interface for the system 200, and may include an alphanumeric keypad for inputting alphanumeric and other key information along with a cursor control device such as a mouse, a track pad or stylus.

The memory 208 of the system 200 stores the software to load it to the disk storage 204. The memory 208 of the system 200 may also store instructions to be used by processor 202 to allow the electronic circuit designer access to the electronic circuit layouts and corresponding subcell views for viewing, editing, or maybe both. The display unit 210 of the system 200 may include a cathode ray tube (CRT) display, liquid crystal display (LCD), plasma, or active matrix organic light emitting diode display. In an embodiment, a graphics subsystem may receive textual and graphical information, and processes the information for output to the display unit 210. In one embodiment, the electronic circuit layouts may be accessed by the electronic circuit designer by way of a graphical user interface or layout editor visualized by the display unit 210. The display unit 210 may also visualize a graphical user interface or the layout editor having a design mode and an edit mode to enable generation an editing of custom electronic circuit designs.

Figure 3A:
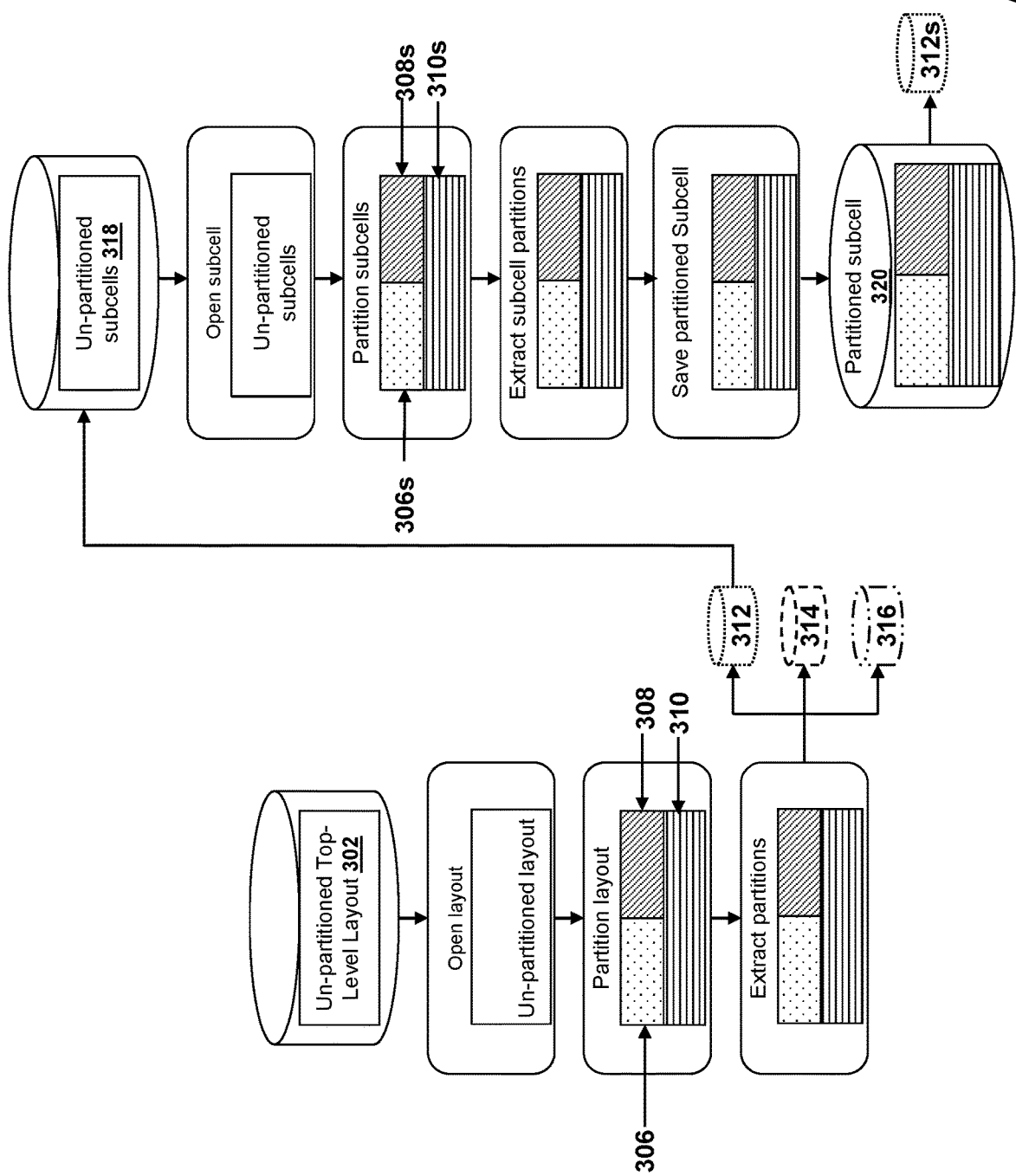
FIG. 3A illustrates partitioning of an electronic circuit layout on a sub level, according to an embodiment.

FIG. 3A and FIG. 3B show execution of partitioning an electronic circuit layout, according to an embodiment. Initially, an electronic circuit layout 302 is created. The electronic circuit layout 302 created is un-partitioned. The electronic circuit layout 302 is a representation of an electronic circuit and its design in various electronic circuit layout data formats. The electronic circuit layout data formats may be in any data format compatible with circuit design software and database storing design, and compatible with downstream processes; examples of such data formats may include, but are not limited to, an OpenAccess™ standard, a GDSII database format, a MEBES database format, and/or an OASIS database format, among others. Such layout formats involve the binary format for the representation of planar geometric shapes. In one embodiment, the electronic circuit layout 302 is typically created through the use of an electronic circuit layout tool, such as those described with reference to FIG. 1. The electronic circuit layout tool saves the electronic circuit layout in a particular file format. The different electronic circuit layout tools may use different formats.

Although the embodiments disclosed herein may use any particular electronic circuit layout format, there may be advantages to having the electronic circuit layout features of the electronic circuit layout defined in an electronic circuit layout database format to enable efficient and relatively quick access to the electronic circuit layout features that are offered by a database management system of the electronic circuit layout database. For example, the electronic circuit layout may contain cells and parameterized cells (pcells). Cells or pcells may contain attributes or parameters defined at one or more levels of a data structure within a database (such as described in FIG. 1), as they may be components for which the circuit layout merely provides space for soldering, for example. Attributes of a cell may be edited on a case-by-case basis, which requires a circuit designer to access the sub-level, while parameters of a pcell may be programmatically updated by the design software when the parameters of the pcell-type have been changed. Embodiments described herein provide for a circuit designer to access to the multiple levels to update attributes of cells and, in some cases, pcells.

After the creation of the electronic circuit layout 302, the un-partitioned electronic circuit layout 302 is stored in a disk storage, which may be any suitable database depending on the EDA and/or PDK application accessing the database. One example of a common database type that can be employed to store and access data associated with the EDA may include databases implementing the OpenAccess' standard. The OpenAccess' is a standard for the electronic circuit designs that allows foundational interoperability for design data between different types of tools.

A layout editor tool is a software tool that allows electronic circuit design managers/electronic circuit designers to view components of the electronic circuit layout 302 stored in the disk at various levels of precision and control. The layout editor tool also allows the electronic circuit design managers/electronic circuit designers to edit (or modify) components of the electronic circuit layout 302 stored in the disk at various levels of precision and control. In one embodiment, the layout editor tool operates to present some or all of the electronic circuit layout 302 to the electronic circuit design manager/electronic circuit designer where the displayable portion of the electronic circuit layout 302 is defined based upon some control or direction provided by the electronic circuit design manager/electronic circuit designer, which allows the layout editor tool to identify the specific objects on the specific layers that need to be displayed.

The EDA may partition the layout according to different aspects or attributes of the electronic circuit design. In some embodiments, the entire electronic circuit layout 302 is defined into partitions, smaller regions of variable or equal size that contains a collection of design figures using the layout editor tool. As an example, (such as in FIGS. 3A-3G), the regions include portions of the electronic circuit layout 302 weighted according to responsibility of each electronic circuit designer. In another embodiment, the regions may be determined by physical area such that each electronic circuit designer designs an equal portion of the layout. In some embodiments, electronic circuit layout 302 is partitioned according to defined classes of component type, size, function, or any other common feature. Each electronic circuit designer may be assigned access to a particular portion of the electronic circuit layout 302 (e.g., an assigned partition). As another example, the entire electronic circuit layout 302 is partitioned (e.g., according to a layer attribute into respective layers of the electronic circuit design). Each layer of the design may contain a plurality of fabrication masks corresponding to an area in which deposition or etching or the like takes place.

In order to create the partitions in the electronic circuit layout 302, the electronic circuit design manager gives a command in the layout editor tool (or other design tools) to open the un-partitioned electronic circuit layout 302. In one embodiment, the electronic circuit design manager will then select and define portions in the un-partitioned electronic circuit layout 302 to be created as partitions and then invoke a command that will result in the processor (such as that described in FIG. 2) completing the partitioning as per the selections made by the electronic circuit design manager. In some implementations, a plurality of electronic circuit designers will make a selection of their desired working area in the electronic circuit layout 302 and provide to the electronic circuit layout manger. The electronic circuit layout manager will then directly invoke a command comprising instructions and selections made by the electronic circuit layout designers that will result in the processor completing the partitioning. The processor and the layout editor tool will then make the desired partitioning of the electronic circuit layout 302, and the portions of the electronic circuit layout separated into partitions are illustrated by 306, 308, and 310. The composition of the top-level partitions 306, 308, and 310 of the electronic circuit layout 302 may be collectively referred to as partitioned electronic circuit layout 304. In the present disclosure, the electronic circuit layout 302 refers to the un-partitioned layout whereas the partitioned layout is referred to as partitioned electronic circuit layout 304.

The partitioned electronic circuit layout is then stored back into the disk. The electronic circuit design manager will assign each of the top-level partitions 306, 308, and 310 of the electronic circuit layout to the plurality of electronic circuit designers for working on the top-level partitions 306, 308, and 310 of the electronic circuit layout. In one embodiment, the electronic circuit design manager will assign a login name and a login password for each of the top-level partitions 306, 308, and 310 of the electronic circuit layout, and provide the login name and the login password to the plurality of electronic circuit designers for accessing the partitions of the electronic circuit layout.

The electronic circuit design manager further gives a command in the layout editor tool (or other design tools) to create corresponding top-level delta views 312, 314, 316 for each of the top-level partitions 306, 308, 310 of the electronic circuit layout, respectively. After invoking the command, the processor initiates the creation of the top-level delta view 312, 314, 316. In one embodiment, the top-level delta views 312, 314, 316 are a cell view, and comprises information/data that enables the electronic circuit designers to detect that this is the top-level delta views 312, 314, 316 and not a regular layout view. In one example, the information/data is encrypted information. A top-level delta view 312 is initially empty upon instantiation. During instantiation, the top-level delta view 312 loads the corresponding cell view from disk into memory. As illustrated and embodied in FIG. 3A and FIG. 3B, the top-level delta views 312, 314, and 316 for each of the top-level partitions 306, 308, and 310 of the electronic circuit layout are empty at the time of their creation. The top-level delta views 312, 314, and 316 for each of the top-level partitions 306, 308, and 310 of the electronic circuit layout are also saved into the disk.

Within a top-level delta view, for example, delta view 312, the electronic circuit designer can view a corresponding partition of the partitioned layout 304. The electronic circuit designer can edit the corresponding partition of the partitioned layout 304 on a top-level or a sub-level (e.g., edit a subcell view of the layout). Using the layout design tool, the electronic circuit designer can issue a descend edit command to access a sub-level of the circuit layout, which contains a plurality of un-partitioned subcell views 318 stored as records in the database. As described above, the un-partitioned subcell views 318 (e.g., the children) inherit the partitions of the partitioned layout 304 (e.g., the parent) within the top-level delta view 312. Thus, when a descend edit command is received, the processor defines un-partitioned subcell views 318 into partitioned subcell views 306s, 308s, 310s according to the parent-child relationship between the partitioned layout 304 and partitioned subcell views 320. Sub-level partitions 306s, 308s, 310s correspond to top-level partitions 306, 308, 310 respectively.

The processor initiates the creation of a sub-level delta view corresponding to the subcell view or plurality of subcell views being edited. In one embodiment, the sub-level delta view is a cell view, and comprises information/data that enables the electronic circuit designers to detect that this is the sub-level delta view and not a regular layout view or the top-level delta view. In one example, the information/data is encrypted information. As illustrated and embodied in FIG. 3B, the sub-level delta view 312s corresponding to top-level delta view 312 (and top-level partition 306 and sub-level partition 306s) is empty at the time of its creation. Sub-level delta views corresponding to top-level delta views 314 and 316 (not pictured) are instantiated at the time of sub-level partitioning of top-level partitions 308 and 310, respectively. The sub-level delta view 312s of the subcell view layout is also saved into the disk.

In some embodiments, a circuit designer editing within the top-level delta view 312 can instantiate a sub-level delta view 312s by selecting an object from within top-level delta view 312 to edit. When sub-level delta view 312s is generated, the top-level delta view 312 then includes a pointer referencing to sub-level delta view 312s; and the sub-level delta view 312s contains a reference pointer back to the parent top-level delta view 312. Each sub-level delta view, such as sub-level delta view 312s, contains a reference pointer to its parent top-level delta view 312; and likewise, each respective top-level delta view 312 contains a similar pointer to its child sub-level delta views, such as sub-level delta view 312s. In this manner, the top-level delta views 312, 314, 316 may contain multiple pointers to a plurality of sub-level delta views. A sub-level delta view has a one-to-one pointer relationship with its parent top-level delta view, whereas a top-level delta view has a one-to-many relationship with its child sub-level delta views.

In some embodiments, a circuit designer editing the top-level delta view 312 can create a new object or instance of a new subcell view within the cell view, such that the processor creates a new database record corresponding to the new subcell view. The circuit designer can alter attributes of the new object (e.g., the shape, size, coordinates) in the top-level delta view, where the new object's coordinates (or other attributes) are included in a partition (e.g., top-level partition 306, sub-level partition 306s) being edited. The subcell view of the new object inherits the attributes (e.g., point list) of the top-level partition and corresponding cell view.

Figure 3C:
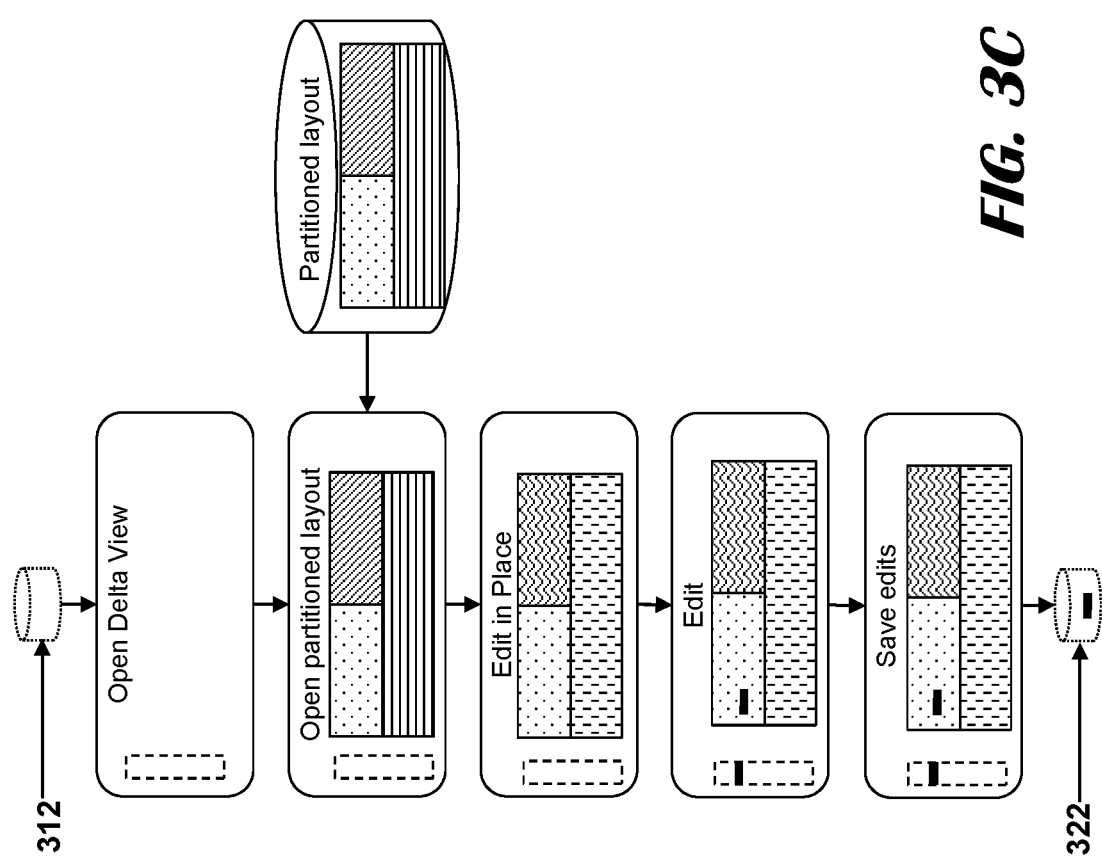
FIG. 3C illustrates concurrent editing of an electronic circuit layout, according to an embodiment.

FIG. 3C shows execution of concurrent editing of an electronic circuit layout, according to an embodiment. In one example, after a top-level partition 306 has been created, a first electronic circuit designer is assigned to the top-level partition 306 of the electronic circuit layout. If the first electronic circuit designer wants to make edits in the top-level partition 306 of the electronic circuit layout, the first electronic circuit designer will initiate the opening of the top-level delta view 312 that corresponds to top-level partition 306 of the electronic circuit layout. The delta view 312 that corresponds to top-level partition 306 of the electronic circuit layout will contain at least some portion of encrypted information that will ensure the first electronic circuit designer that the view opened is really the top-level delta view 312 that corresponds to the top-level partition 306 of the electronic circuit layout. In an embodiment, the top-level delta view 312 will be opened in a write mode. After the opening of the write mode of the top-level delta view 312, the partitioned electronic circuit layout is also opened automatically. From there the electronic circuit designer can begin editing within top-level delta view 312. The edits will be registered in an edited version of the top-level delta view 312 referred to as edited delta view 322. The first electronic circuit designer will save the edits after they are completed and the edits are saved in the edited delta view 322.

Figure 3D:
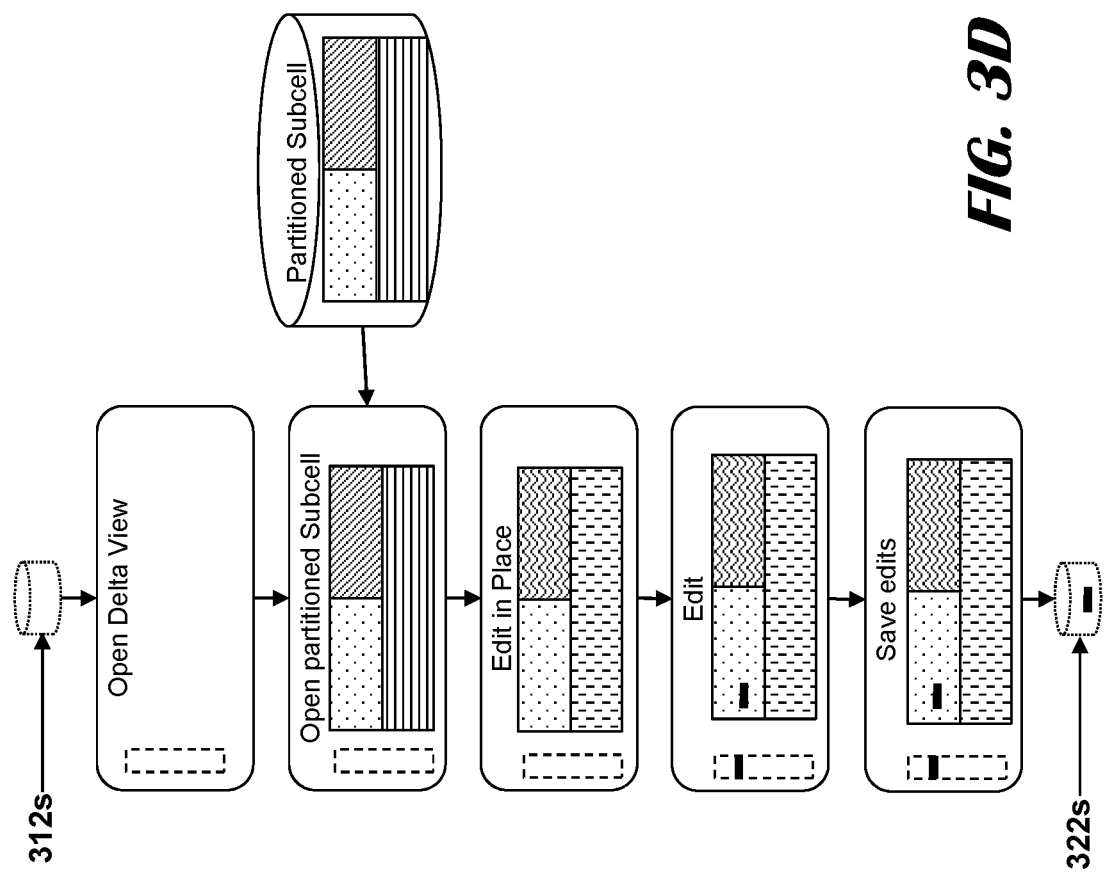
FIG. 3D illustrates concurrent editing of a sub view of an electronic circuit layout, according to an embodiment.

FIG. 3D shows an alternative execution of concurrent editing of a subcell view of an electronic circuit layout according to an embodiment continued from FIG. 3C. Instead of choosing to edit the top-level partition 306 within top-level delta view 312, the first electronic circuit designer can initiate a descend edit command. The user enters the command via the layout editing tool on the client computer within the top-level delta view. The client computer then transmits the command to the server to access the sub-level database. A descend edit command is an instruction prompted by a user input via a GUI to open an object or instance within the cell view, and is sent from the client computer to the server to access a subcell view associated with the object, such as a particular data table or cell stored within a layout database (such as described in FIG. 1). The command is initiated from within the top-level delta view 312, which is a database record containing data based on other database records, such as a top-level partition 306, and which can be accessed or otherwise referenced to establish and inherit data for a sub-level partition 306s within partitioned subcell view 320. After data (e.g., attributes) of the top-level partitions 306, 308, 310 have been properly inherited by the sub-level partitions 306s, 308s, 310s, the first electronic circuit designer will further instantiate a sub-level delta view 312s (e.g., a child delta view generated from top-level delta view 312), which may be stored as a database record. The sub-level delta view 312s may be accessed by the first designer via a GUI to edit the subcell views stored within the sub-level of the database. The first electronic designer can begin editing a subcell view contained within sub-level partition 306s by accessing a sub-level delta view 312s; these edits made on a lower hierarchical level are conceptually an extension of edits made at top-level delta view 312. The edits will be registered in an edited version of the sub-level delta view 312s referred to as edited sub-level delta view 322s. The first electronic circuit designer will save the edits after they are completed and the edits are saved in the edited sub-level delta view 322s. Edits made to a top-level partition 306 or sub-level partition 306s are registered in a top-level delta view 312 or sub-level delta view 312s. When the first designer accesses a top-level partition 306, the client computer opens a GUI allowing the first designer to review previous edits and continue editing.

FIG. 3E shows execution of concurrent editing of a subcell view of an electronic circuit layout, according to an embodiment. If the first electronic circuit designer wants to make further edits in the sub-level partition 306s corresponding to a subcell view, the first electronic circuit designer will open the edited sub-level delta view 322s corresponding to sub-level partition 306s. In an embodiment, the first electronic circuit designer will check the prior edits made to make sure the view opened is the edited sub-level delta view 322s corresponding to the sub-level partition 306s of the electronic circuit layout. The edited sub-level delta view 322s is opened in a write mode. After the opening of the write mode of the edited sub-level delta view 322s, the partitioned subcell view will be opened automatically. The concurrent layout editor will apply the edits previously stored in the opened edited sub-level delta view 322s to the partitioned subcell view. The first electronic circuit designer will then edit the partition 306s of the partitioned electronic circuit layout, and the edits will get registered in an edited version of the edited sub-level delta view 322s referred to as new edited sub-level delta view 332s. The first electronic circuit designer will save the edits after they are completed and the edits are saved in the new edited sub-level delta view 332s.

Figure 3F:
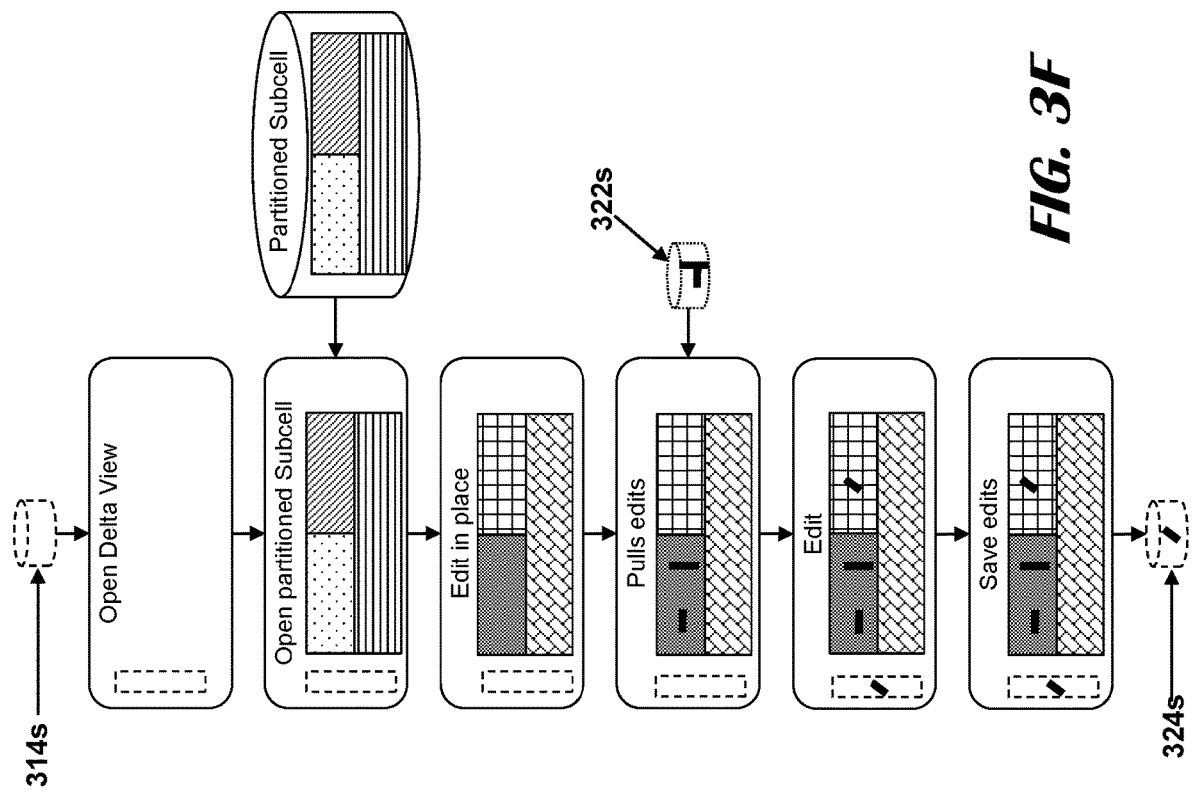
FIG. 3F illustrates concurrent editing of a sub view of an electronic circuit layout, according to an embodiment.

FIG. 3F shows execution of concurrent editing of an electronic circuit layout, according to an embodiment. If another electronic circuit designer other than the first electronic circuit designer (for example, a second electronic circuit designer) wants to make edits in sub-level partition 308s of the electronic circuit layout, the second electronic circuit designer will open the top-level delta view 314 that corresponds to the partition 308 of the electronic circuit layout. The top-level delta view 314 that corresponds to its partition 308 of the electronic circuit layout will contain at least some portion of encrypted information that will ensure the second electronic circuit designer that the view opened is really the delta view 314 corresponding to partition 308 of the electronic circuit layout. In an embodiment, the delta view 314 is opened in a write mode. After the opening of the write mode of delta view 314, the partitioned electronic circuit layout is opened automatically. The second electronic circuit designer may edit the top-level partition 308 similar to the embodiment described in FIG. 3C, or may issue a descend edit command.

The descend edit command enters the subcell views and partitions the subcell views according to the parent partition such that the second electronic circuit designer can access sub-level partition 308s corresponding to top-level partition 308. The second electronic circuit designer will instantiate sub-level delta view 314s, and will initiate the edits in the partition 308s of the partitioned subcell view, and the edits will get registered in an edited version of the sub-level delta view 314s referred to as edited sub-level delta view 324s. The second electronic circuit designer will save the edits after they are completed and the edits are saved in the edited sub-level delta view 324s. In an embodiment, the second electronic circuit designer may also pull the edits in from the new edited sub-level delta view 322s performed by the first electronic circuit designer. In operation, because edited delta view 322 and edited sub-level delta view 322s have a parent-child relationship (e.g., where edited sub-level delta view 322s was edited in the context of edited delta view 322), the client computer of the second designer will pull in the edited delta view 322 and edited sub-level delta view 322s together. As in FIG. 3F, an edited sub-level delta view 322s is pulled in automatically when a peer designer accesses a top-level delta view 314 and then pulls in an edited delta view 322. The peer designer is not required to make edits to the sub-level delta view 314s to be able to see (via a GUI) the edited sub-level delta view 322s.

Figure 3G:
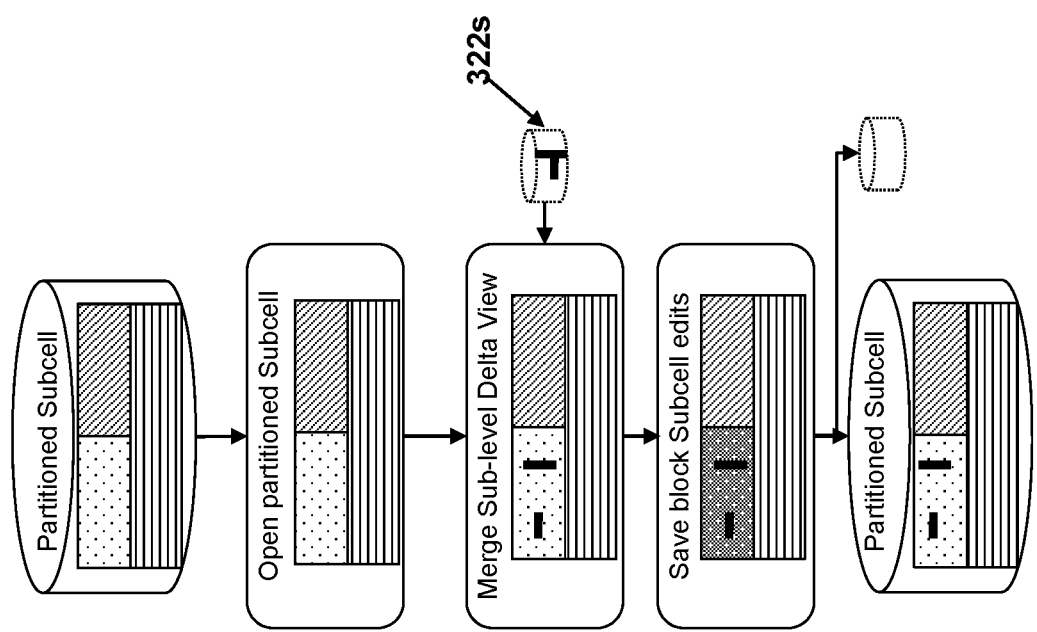
FIG. 3G illustrates merging of edited electronic circuit sub views, according to an embodiment.

FIG. 3G shows execution of merging of edited electronic circuit layout at a sub-level of a subcell view (e.g., child level), according to an embodiment. An electronic circuit design manager opens the partitioned subcell view and the new edited sub-level delta view 322s. The partitioned subcell view is opened in a write mode. The electronic circuit design manager merges the new edited sub-level delta view 322s to the partitioned subcell view. In operation, merging or otherwise modifying the edited sub-level delta view 322s may occur automatically when a manager user and/or managing software component (e.g., a layout manager software routine) merges or modifies the edited top-level delta view 322 to include the edits stored within sub-level delta view 322s, due to the edited sub-level delta view 322s having been edited in the context of the edited top-level delta view 322.

The edits in the new edited sub-level delta view 322s are then saved into the partitioned subcell view, and the new edited sub-level delta view 322s is then reset to make it empty. In addition, with reference to FIG. 3B, the parent-child relationship is realized during the merge via a layout configuration function utilizing the pointers of top-level delta view 312 and sub-level delta view 322s, thus linking the child edits back to the parent such that the edits to partition 306s are saved within parent delta view 312. This is possible by utilizing the pointers as a reference when making edits to edit the database records of both the top-level delta view and the sub-level delta view without otherwise altering the top-level or sub-level partition database records. The electronic circuit design manager can then merge the edits saved within parent delta view 312 to the electronic circuit layout. The electronic circuit layout having the edits is now an original version, which is saved to the disk, and top-level delta view 312 is reset. Thus, a similar process occurs for merging edits at both levels; parent edited delta views are merged with the parent partition (electronic circuit layout partition), and child edited delta views are merged with the child partition (sub-level partition).

In some embodiments, a design component is defined by a set of subcell views existing within a sub-level partition. In some cases, a design component may be shared by two or more top-level partitions; this results in the set of subcell views straddling the two or more top-level partitions. For example, a top-level partition may be partitioned to generate regions of a same area. However, not all design components of the electronic circuit design will be perfectly separated into such regions; many components will straddle two or more partitions. Therefore, the set of subcell views corresponding to a component straddling two or more partitions will be separated along the same partition lines to give the first electronic circuit designer access to a first portion of the set of subcell views and the second electronic circuit designer access to a second portion of the set of subcell views corresponding to the straddling component. This splitting and editing of straddling components is handled on a lower level to enable access to a component at the sub-level even if it does not exist wholly within a single partition at a top level. Thus, when editing instances of, for example, a cell view on the sub level, an electronic circuit designer is only responsible for the parameters of the cell views wholly or partially within an assigned partition.

FIG. 4 is a flow diagram showing execution steps of a process 400 for editing of an electronic circuit layout, according to an embodiment using a system such as that described in FIG. 1 and FIG. 2. The process 400 may be executed by a computing device running EDA software. It should also be understood that the steps shown and described herein are merely illustrative and additional, alternative, and fewer number of steps should be considered to be within the scope of this disclosure.

At a first step 402, a server receives an instruction to access and open a file for an electronic circuit layout within a layout database. In one embodiment, the electronic circuit layout characterizes an electronic circuit in planar geometric shapes. Further, the electronic circuit layout is a representation of the electronic circuit in various electronic circuit layout data formats. The electronic circuit layout data formats involve a binary format for the representation of planar geometric shapes and text labels. An electronic circuit design manager will open the electronic circuit layout on a suitable user interface using a suitable software application.

The electronic circuit layout of the electronic circuit may be created by a computing device (e.g., client computer, server computer, desktop computer, laptop computer) executing or otherwise hosting an Electronic Design Automation (EDA) software system, and stored in non-transitory machine-readable storage of a layout database, such as an OpenAccess™ database, where, for example, the electronic circuit layout data formats may be stored in a GDS database format. The electronic circuit designers design electronic circuit by transforming logical or circuit descriptions of the electronic circuit into geometric descriptions called "layouts" using the computer executing the EDA software application. The electronic circuit layouts may include geometric representations of electronic circuit elements that are to be fabricated on a wafer, such as electronic circuit components, and may further include several geometries, such as geometric representations of electronic or circuit components with pins, interconnect lines, and wiring that connects the pins on a same layer. The processor and the computer-based tools of the EDA applications may also be used for partitioning, editing, and analyzing electronic circuit design layouts, along with the creation of the electronic circuit layout.

At step 404, a processor of the server creates a plurality of partitions within the electronic circuit layout, each partition containing at least a portion of data stored in the layout database. Each of the plurality of partitions created depicts at least a portion of the electronic circuit layout, which is different from a portion of the electronic circuit layout in others of the plurality of partitions. The electronic circuit design manager will give a partition command to the processor to create the plurality of partitions in the electronic circuit layout of the electronic circuit. The partition command will include details relating to collection of figures to be included in each partition of the plurality of partitions of the electronic circuit layout. Further, a login name and a login password may be assigned to each of the plurality of partitions of the electronic circuit layout wherein the login name relates to each of plurality of electronic circuit designers assigned to operate on the plurality of partitions of the electronic design layout. Each of the plurality of electronic circuit designers upon entering the login name and the login address can access their corresponding plurality of partitions of the electronic circuit layout. It also should be appreciated that the partition command can allocate access to each of the plurality of partitions through any other measures and criteria selected by the electronic circuit designer and not be limited to the login name and password set up.

At step 406, the processor of the server creates a delta view able to be viewed within a GUI of a client device corresponding to each partition. The electronic circuit design manager gives a command to the processor of the server via the client device to generate a top-level delta view for each of the plurality of partitions. After invoking the command, the processor initiates the creation of the top-level delta view. In one embodiment, the delta view is a cell view, and comprises information/data that enables the electronic circuit designers to detect that this is the delta view and not a regular layout view. In one example, the information/data is encrypted information. The top-level delta view for each of the plurality of partitions of the electronic circuit layout is empty at the time of its creation. The delta view for each of the plurality of partitions of the electronic circuit layout is also saved into the non-transitory machine-readable layout database. It also should be appreciated that any other suitable cell view can be presented as the top-level delta view of partitioned electronic circuit layout information/data that is distinctive and separate from the regular views of the layout tool. The cell view and its underlying functionalities may be implemented on any database management service or application (e.g., using the OpenAccess™ standard) or as an extension to the database management service or application (e.g., the OpenAccess' standard).

At step 408, the processor of the server receives a command to descend into a lower level of a hierarchy of data cells. Specifically, the respective electronic circuit designer issues a command within the top-level delta view generated in step 406 to instruct the server to descend into a sub-level of the layout database for editing a subcell view associated with the top-level partition. Within the top-level delta view, the electronic circuit designer can select a subcell view or a set of subcell views of the electronic circuit layout existing in a sub-level of the layout and contained in the layout database. The subcell views able to be selected by the electronic circuit designer are associated with the top-level partition and top-level delta view in which edits are being made.

At step 410, the processor of the server receives an instruction to partition the subcell views of the electronic circuit design according to the same attributes of the top-level partitions within the layout database. The processor defines a plurality of sub-level partitions of electronic circuit subcell views. Each of the plurality of sub-level partitions created depicts at least a portion of electronic circuit subcell views, which is different from a portion of the electronic circuit subcell views in other sub-level partitions. The electronic circuit design manager gives a sub-level partition command to the processor to create the plurality of sub-level partitions in the subcell views of the electronic circuit. The partition command includes details relating to collection of figures to be included in each partition of the plurality of sub-level partitions. The plurality of sub-level partitions inherit the properties of the top-level partitions to which they correspond. Therefore, an additional login name and a login password may not be needed to access the plurality of sub-level partitions of the electronic circuit subcell views. Each of the plurality of electronic circuit designers upon entering the login name and the login address at the top-level partitions can access their corresponding plurality of sub-level partitions of the electronic circuit subcell views. The partition command can allocate access to each of the plurality of sub-level partitions through any other measures and criteria selected by the electronic circuit designer and should not be limited to the login name and password set up.

At step 412, the processor of the server generates a sub-level delta view corresponding to each sub-level partition to be displayed on the client device to the electronic circuit designer. The electronic circuit designer working within the top-level delta view gives a command to the processor to generate a sub-level delta view for each of the plurality of sub-level partitions. After invoking the command, the processor initiates the creation of the delta view. In one embodiment, the delta view is a cell view, and comprises information/data that enables the electronic circuit designers to detect that this is the sub-level delta view and not a top-level delta view. In one example, the information/data is encrypted information. The sub-level delta view for each of the plurality of sub-level partitions of the electronic circuit subcell views is empty at the time of its creation. The sub-level delta view for each of the plurality of sub-level partitions is also saved into the non-transitory machine-readable layout database. It also should be appreciated that any other cell view can be presented as the sub-level delta view of partitioned subcell view information/data that is distinctive and separate from the regular views of the layout tool. The cell view and its underlying functionalities may be implemented on any database management service or application (e.g., using the OpenAccess' standard) or as an extension to the database management service or application (e.g., the OpenAccess' standard).

At step 414, the processor of the server receives instructions to make edits to the layout database corresponding to edits the electronic circuit designer makes within the layout or a corresponding subcell view in the sub-level delta view. In response to a plurality of commands by the plurality of electronic circuit designers associated to each of the plurality of partitions, the processor enables concurrent modification of contents of the each of the plurality of sub-level partitions at a same time. This allows each of the plurality of electronic circuit designers to simultaneously work and perform modification (or initiate modification) in their respective sub-level delta views. After the modifications, the electronic circuit designers can update and save modified (edited) contents for each of the plurality of partitions in their corresponding delta view.

In an embodiment, the layout editor tool may be used for modifying the contents of the each of the plurality of partitions by the plurality of electronic circuit designers. The layout editor tool may be an analog layout tool or a digital tool. Using the layout editor tool, the plurality of electronic circuit designers may also send a request to the processor to modify the contents in the delta view corresponding to the plurality of sub-level partitions. After the modification is completed, the modified contents are locally saved in the sub-level delta view associated to each of the plurality of sub-level partitions in a non-volatile memory. The modified contents for each of the plurality of sub-level partitions in their corresponding delta view may be viewable by each of the plurality of electronic circuit designers and the electronic circuit design manager. In one embodiment, the electronic circuit designer for a given partition of the subcell view/electronic circuit layout may have to provide access to other electronic circuit designers and electronic circuit manager to view the modified contents in the delta view for the given partition. In another embodiment, the electronic circuit designer for a given partition does not have to provide access to other electronic circuit designers and electronic circuit manager to view the modified contents in the sub-level delta view for the given partition as they are sent an automatic alert on modifications performed by the EDA system when the modified contents are stored.

At step 416, the processor of the server receives an instruction to merge saved files of both the top-level and sub-level delta views (e.g., files corresponding to different versions edited over time). Merging the edits takes place at both the sub level and the top level of the electronic circuit design. More specifically, the electronic circuit design manager can view the modified contents in the sub-level delta view associated to each of the plurality of sub-level partitions, and initiates a merge command to the processor for merging the modified contents in the sub-level delta views corresponding to each of the plurality of sub-level partitions in an original copy of the subcell view. These edits are likewise accessible in the corresponding top-level delta views. In operation, the electronic circuit design manager will issue a merge command from the client computer to the EDA server only in a top-level partition, such as top-level partition. To implement the merge command, the processor merges all sub-level delta views into the subcell view and merges all top-level delta views into the cell view. All changes made can be merged into the database records corresponding to the cell view and the subcell view, respectively. After merging, the top-level delta view and the sub-level delta view are emptied in preparation for the next set of revisions. Therefore, the delta views, upon opening, can load in the recently updated cell view and subcell view as last merged.

In one embodiment, the electronic circuit design manager can accept all the modifications in the modified contents for each of the plurality of sub-level partitions in their corresponding sub-level delta view prior to the merging of the modified contents of sub-level delta views in the subcell view. In another embodiment, the electronic circuit design manager can decline all the modifications in the modified contents for each of the plurality of sub-level partitions in their corresponding sub-level delta view and does not merge the modified contents of each sub-level delta view in the subcell view. In yet another embodiment, the electronic circuit design manager may accept some modifications and decline some modifications of the modified contents for each of the plurality of sub-level partitions in their corresponding sub-level delta view prior to the merging of the modified contents of each sub-level delta view in the subcell view. Alternatively, based on particular criteria, settings, or design rules, the layout editor tool may determine which edits to accept or decline, in which the layout editor tool may take the action itself or present its recommendation to the electronic circuit design manager.

The merged modified contents of the subcell view is saved as an updated version of the subcell view until the electronic circuit design manager can accept edits on a top level within the top-level delta views corresponding to the plurality of top-level partitions. In doing so, edits are merged on both a child level and a parent level separately such that child edits are not affected by parent edits and vice versa. Similar embodiments for merging at the sub-level apply for merging of the modified contents of the plurality of top-level partitions in their corresponding top-level delta views into the electronic circuit layout. A version of the original electronic circuit layout including the edits that are merged into it is stored in the non-transitory machine-readable layout database or in any other suitable database.

In addition, with reference to FIG. 3B, the parent-child relationship is realized during the merge via a layout configuration function, which references the pointer values that link the child edits back to the parent. Edits to sub-level delta view 312s are saved or merged within the corresponding subcell view database record. The electronic circuit design manager can then manually or automatically merge the edits saved within parent delta view 312 to the electronic circuit layout. The edits to the top-level delta view 312 can automatically include edits in the sub-level delta view 312s when a merge command software routine references (according to a pointer) the sub-level delta view 312s. Edits to the top-level delta view 312 are merged within the corresponding cell view database record. The electronic circuit layout having the merged edits is now an original version, which is saved to the disk, and one or more delta views are reset.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A processor-implemented method for at least two computers to concurrently create an electronic circuit layout, the method comprising:

generating, by a processor, a plurality of top-level partitions from a circuit layout according to a predefined attribute, each respective top-level partition corresponding to a portion of the electronic circuit layout at a top level stored as a first database record including the predefined attribute;

generating, by the processor, a plurality of top-level delta views corresponding respectively to each top-level partition, wherein each respective top-level delta view is a cell view configured to store edits to the respective top-level partition as a second database record;

in response to receiving, from a client computer having access rights to the top-level partition, a command to modify the cell view from the top-level partition:

modifying, by the processor, the second database record corresponding to the top-level delta view, thereby resulting in a modified second database record containing a modified top-level delta view;

in response to receiving, from the client computer, a command to modify a subcell view from a top-level partition:

generating, by the processor, a plurality of sub-level partitions based upon the predefined attribute, each respective sub-level partition comprising the predefined attribute inherited from the top-level partition that corresponds to the portion of the electronic circuit layout at a sub level stored as a third database record including the predefined attribute;

generating, by the processor, a plurality of sub-level delta views corresponding respectively to each sub-level partition, wherein each respective sub-level delta view is a subcell view configured to store edits to the respective sub-level partition as a fourth database record; and modifying, by the processor, the fourth database record corresponding to the sub-level delta view according to the command, thereby resulting in a modified fourth database record containing a modified sub-level delta view; and displaying, by the processor, a representation of the modified sub-level delta view to the client computer having the access rights, wherein the first database record and the third database record remain unmodified by the commands.

2. The method according to claim 1, further comprising:

in response to receiving, from the client computer, a merge command at the top-level partition:

modifying, by the processor, the third database record associated with the sub-level partition according to the modified fourth database record, thereby resulting in a modified third database record corresponding to a modified subcell view comprising a modified electronic circuit portion at the sub level; and modifying, by the processor, the first database record associated with the top-level partition according to the modified second database record, thereby resulting in a modified first database record corresponding to a modified cell view comprising a modified electronic circuit portion at the top level.

3. The method according to claim 1, further comprising displaying, by the processor, the sub-level delta view to one or more client computers via a design interface.

4. The method according to claim 1, further comprising displaying, by the processor, the top-level delta view to one or more client computers via a design interface.

5. The method according to claim 1, further comprising concurrently rendering, by the processor, one or more design layout interfaces each showing at least one top-level partition of the plurality of top-level partitions, wherein the at least one top-level partition is configured to be edited using the respective design layout interface.

6. The method according to claim 1, further comprising concurrently rendering, by the processor, one or more design layout interfaces each showing at least one sub-level partition of the plurality of sub-level partitions, wherein the at least one sub-level partition is configured to be edited using the respective design layout interface.

7. The method according to claim 1, further comprising updating, by the processor, the electronic circuit layout according to one or more modified top-level delta views.

8. The method according to claim 1, wherein receiving the command to modify the sub-level partition further comprises:

determining, by the processor, that the client computer is assigned the access rights to the respective top-level partition having the portion to be modified by the command.

9. The method according to claim 1, wherein receiving the command to modify the sub-level partition further comprises:

determining, by the processor, that the portion to be modified by the command comprises subcell views within the sub-level partition to which the client computer is assigned the access rights.

10. The method according to claim 1, wherein modifying the subcell view of the sub-level partition further comprises:

determining, by the processor, that the modified portion comprises subcell views within the sub-level partition to which the client computer is assigned the access rights.

11. A system for creating an electronic circuit layout, comprising:

a non-transitory machine-readable layout database storing an electronic circuit layout of an electronic circuit; and a processor configured to:

generate a plurality of top-level partitions from a circuit layout according to a predefined attribute, each respective top-level partition corresponding to a portion of the electronic circuit layout at a top level stored as a first database record including the predefined attribute;

generate a plurality of top-level delta views corresponding respectively to each top-level partition, wherein each respective top-level delta view is a cell view configured to store edits to the respective top-level partition as a second database record;

receive, from a client computer, a command to modify the cell view, wherein in response to the processor receiving the command:

modify the second database record corresponding to the top-level delta view, thereby resulting in a modified second database record containing a modified top-level delta view, and receive, from the client computer, a command to modify the subcell view, wherein in response to the processor receiving the command:

generate a plurality of sub-level partitions from a plurality of subcell views based upon the predefined attribute, each respective sub-level partition comprising the predefined attribute inherited from the top-level partition that corresponds to the portion of the electronic circuit layout at a sub level stored as a third database record including the predefined attribute; and generate a plurality of sub-level delta views corresponding respectively to each sub-level partition, wherein each respective sub-level delta view is a subcell view configured to store edits to the respective subcell as a fourth database record; and receive, from the client computer, a command to modify the subcell view within a sub-level partition, wherein in response to the processor receiving the command:

modify the fourth database record corresponding to the sub-level delta view according to the command, thereby resulting in a modified fourth database record containing a modified sub-level delta view;

wherein the first database record and the third database record remain unmodified by the commands.

12. The system according to claim 11, wherein the processor is further configured to, in response to the processor receiving a merge command:

modify, based on the modified fourth database record, the third database record associated with the sub-level partition, thereby resulting in a modified third database record corresponding to a modified subcell view comprising a modified electronic circuit portion at a sub level, and modify, based on the modified second database record, the first database record associated with the top-level partition, thereby resulting in a modified first database record corresponding to a modified cell view comprising a modified electronic circuit portion at a top level.

13. The system according to claim 11, wherein the processor is further configured to, in response to the processor receiving the command:

determine that the client computer is assigned rights to the respective top-level partition having the cell view to be modified by the command; and determine that the cell view to be modified by the command comprises a subcell view within the sub-level partition to which the client computer is assigned rights.

14. The system according to claim 11, wherein the processor is further configured to, in response to the processor receiving the command:

determine that the modified portion comprises one or more subcell views within the sub-level partition to which the client computer is assigned rights.

15. The system according to claim 11, wherein the processor is further configured to concurrently render one or more design layout interfaces each showing at least one top-level partition of the plurality of top-level partitions, wherein the at least one top-level partition is configured to be edited using the respective design layout interface.

16. The system according to claim 11, wherein the processor is further configured to concurrently render, by the processor, one or more design layout interfaces each showing at least one sub-level partition of the plurality of sub-level partitions, wherein the at least one sub-level partition is configured to be edited using the respective design layout interface.

17. A processor-implemented method for creating an electronic circuit layout, the method comprising:

generating, by a processor, a plurality of top-level partitions from a circuit layout according to a predefined attribute, each respective top-level partition corresponding to a portion of the electronic circuit layout at a top level stored as a first database record including the predefined attribute;

generating, by the processor, a plurality of top-level delta views corresponding respectively to each top-level partition, wherein each respective top-level delta view is a cell view configured to store edits to the top-level partition as a second database record;

generating, by the processor, a plurality of sub-level partitions from a selected cell view in a top-level delta view, each respective sub-level partition corresponding to the portion of the electronic circuit layout at a sub level stored as a third database record;

generating, by the processor, a plurality of sub-level delta views corresponding respectively to each sub-level partition, wherein each respective sub-level delta view is a cell view configured to store edits to the respective sub-level partition as a fourth database record; and in response to receiving, from a client computer, a command to modify the cell view from a top-level partition:

modifying, by the processor, the second database record corresponding to the top-level delta view according to the command, thereby resulting in a modified second database record corresponding to a modified top-level delta view;

modifying, by the processor, based on the modified second database record, the fourth database record corresponding to the sub-level delta view inherited from the modified top-level delta view, thereby resulting in a modified fourth database record containing a modified sub-level delta view inherited from the modified top-level partition, wherein the first database record and the third database record remain unchanged by the command.

18. The method according to claim 17, further comprising concurrently rendering, by the processor, one or more design layout interfaces each showing at least one top-level partition of the plurality of top-level partitions, wherein the at least one top-level partition is configured to be edited using the respective design layout interface.

19. The method according to claim 17, further comprising concurrently rendering, by the processor, one or more design layout interfaces each showing at least one sub-level partition of the plurality of sub-level partitions, wherein the at least one sub-level partition is configured to be edited using the respective design layout interface.

20. The method according to claim 17, wherein receiving the command to modify the portion of the top-level partition further comprises:

determining, by the processor, that the client computer is assigned rights to the respective top-level partition to be modified by the command.

* * * * *